(No Model.)

C. SEYBOLD.
MECHANISM FOR VARYING THROW OF CRANKS.

No. 560,434. Patented May 19, 1896.

WITNESSES:
Chas. W. Thomas
Eugenie A. Perridee

INVENTOR:
Christian Seybold,
BY
A. Faber du Faur,
ATTORNEY

ANDREW B.GRAHAM, PHOTO-LITHO. WASHINGTON, D.C.

UNITED STATES PATENT OFFICE.

CHRISTIAN SEYBOLD, OF ZWEIBRÜCKEN, GERMANY.

MECHANISM FOR VARYING THROW OF CRANKS.

SPECIFICATION forming part of Letters Patent No. 560,434, dated May 19, 1896.

Application filed May 8, 1895. Serial No. 548,564. (No model.) Patented in Germany December 4, 1892, No. 76,750, and June 24, 1893, No. 78,832, and in Austria-Hungary November 22, 1893, No. 36,004 and No. 56,165.

*To all whom it may concern:*

Be it known that I, CHRISTIAN SEYBOLD, a subject of the Emperor of Germany, residing at Zweibrücken, Palatinate, Kingdom of Bavaria, Germany, have invented new and useful Improvements in Mechanisms for Varying the Throw of Cranks, (for which I have obtained Letters Patent in Germany, No. 76,750, dated December 4, 1892, and No. 78,832, dated June 24, 1893, and in Austria-Hungary, No. 36,004 and No. 56,165, dated November 22, 1893,) of which the following is a specification.

My invention has reference to improvements in means for changing the throw of cranks of machinery while in motion; and it consists, essentially, in the combination of a hollow revolving shaft carrying a head with slideways, a carriage guided in said ways and carrying the crank-pin, a rod secured against turning passing through the hollow shaft and carrying a head, means for moving said rod in the direction of its length, and an operative connection between the carriage and the head of the rod for sliding the carriage at right angles to the shaft by the longitudinal motion of the rod.

The nature of my said invention will best be understood when described in connection with the accompanying drawings, in which—

Figure 1:
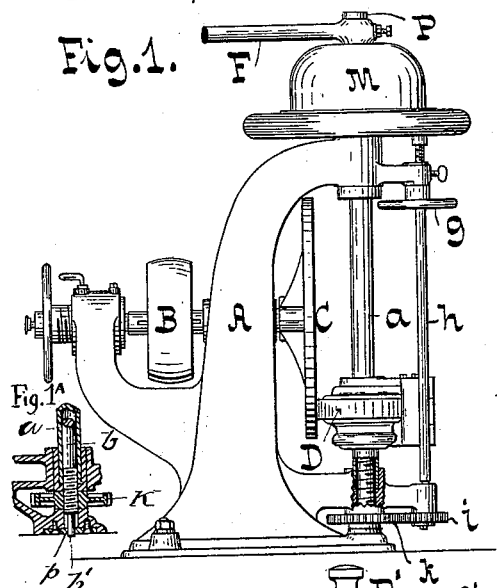
Figure 2:
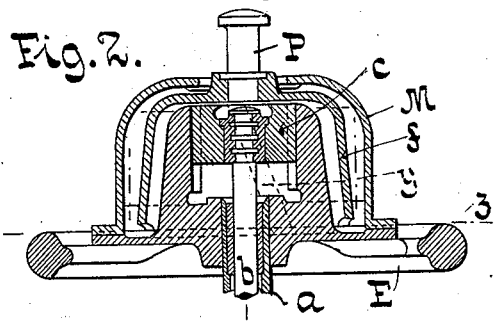
Figure 7:
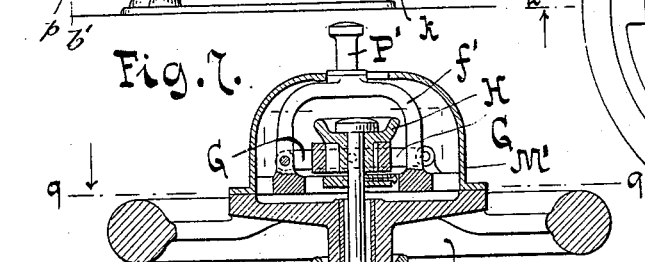
Figure 3:
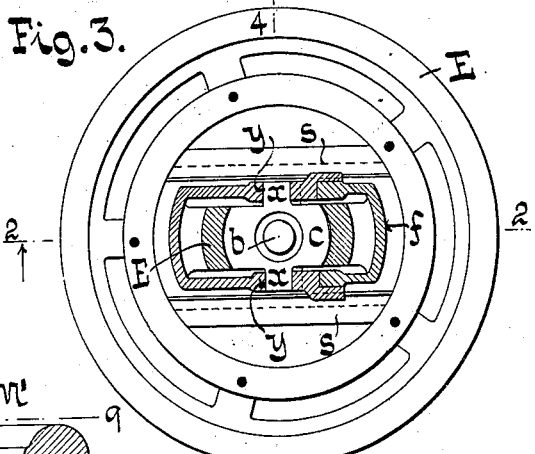
Figure 8:
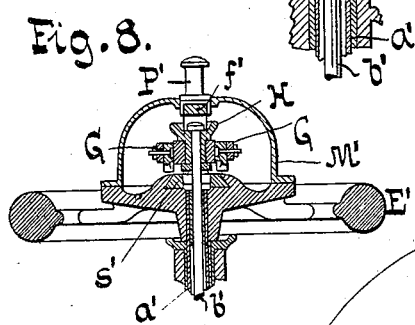
Figures 4, 5, 6:
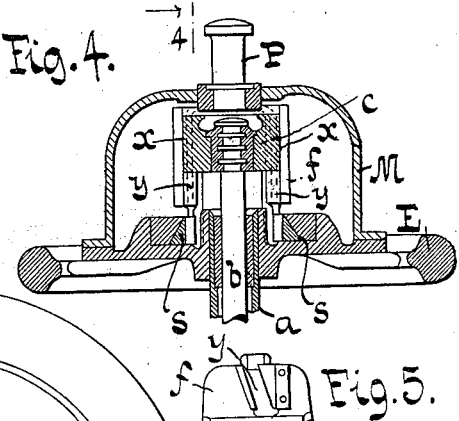
Figure 9:
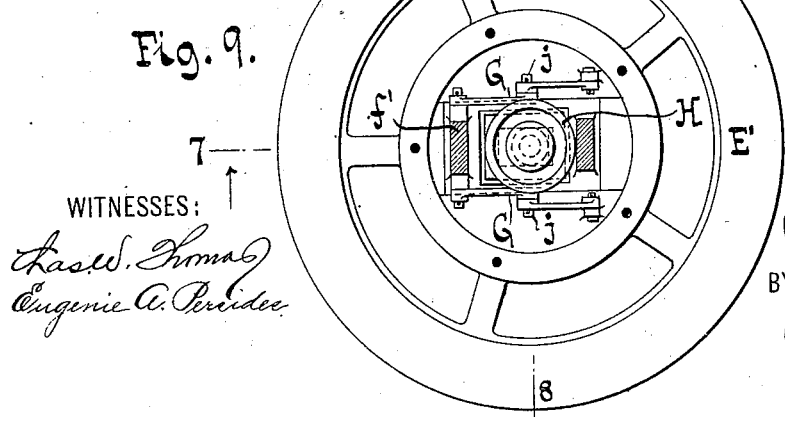

Figure 1 represents an elevation, partly in section, of a machine for shaking sieves, &c., embodying my invention. Fig. 1$^a$ is a vertical section illustrating the means for preventing rotation of the throw-adjusting rod. Fig. 2 is a vertical section, on an enlarged scale, the plane of section being taken on the line 2 2, Fig. 3. Fig. 3 is a horizontal section on the line 3 3, Fig. 2. Fig. 4 is a vertical section on the line 4 4, Fig. 3. Figs. 5 and 6 are detail views. Fig. 7 is a vertical section on the line 7 7, Fig. 9, illustrating a modified form. Fig. 8 is a like section on the line 8 8, Fig. 9. Fig. 9 is a horizontal section on the line 9 9, Fig. 7.

Similar letters of reference designate corresponding parts throughout the several views of the drawings.

Referring at present to Fig. 1 of the drawings, the letter A designates the frame of the machine, and B is the driving-pulley, on the shaft of which is mounted a disk C.

$a$ is a hollow shaft to which motion is imparted from the disk C through a vertically-adjustable friction-wheel D. Through the hollow shaft $a$ is passed a rod $b$, mounted to be capable to move in the direction of its length, but prevented from turning. At its lower end this rod is threaded to receive a gear-wheel $k$, meshing into a gear-wheel $i$ on a vertical shaft $h$, having thereon a hand-wheel $g$. By turning this hand-wheel in one direction the rod $b$ is raised, and by turning it in the opposite direction said rod is lowered. In the present example, Fig. 1$^a$, the rod is prevented from turning by partly squaring its lower end, as at $b'$, and causing the same to engage with a socket formed in a plate $p$, secured in the bottom of the frame of the machine. At its upper end the rod $b$ is provided with a journal held in a journal-box $c$, provided with inclined lugs $x$, Figs. 2, 3, 4, and 6. The box $c$ is guided in vertical ways formed in upwardly-projecting parts of the head or fly-wheel E. A carriage $f$ is mounted free to move in horizontal ways $s$, formed in the head or fly-wheel E and provided with inclined slots $y$, Fig. 5, which are entered by the lugs $x$ of the journal-box $c$, Fig. 3. To the top of the carriage $f$ is affixed the crank-pin P, which is connected by the connecting-rod F to the part to be reciprocated.

The casing M incloses the sliding carriage and is provided with an opening permitting the crank-pin to reciprocate.

To change the throw of the crank-pin P, the rod $b$ is raised or lowered by turning the hand-wheel $g$, thereby causing the lugs $x$ on the journal-box $c$ to move within the slots of the carriage $f$. This motion of the lugs moves the carriage $f$ in its ways and shifts the crank-pin.

I do not wish to restrict myself to the inclined surfaces for imparting transverse motion to the carriage $f$, since other equivalent means may be used for this purpose.

In Figs. 7, 8, and 9 I have illustrated a construction in which the carriage $f$ is actuated by two toggle-levers G G, one end of each being pivoted to the head or fly-wheel F and the other end to the carriage $f'$, while the pivot-pins $j$, connecting the levers on each side, engage slots in a journal H, secured to the upper end of the rod $b$. By raising or lowering the rod $b$ the carriage is moved in or out, thus changing the distance of the crank-pin from the center.

While I have herein shown the mechanism applied to a vertical shaft it is evident that it can similarly be applied to a horizontal shaft.

What I claim as new is—

1. The herein-described mechanism for varying the throw of cranks, consisting of a hollow revolving shaft provided with a head, a carriage guided in said head to move at right angles to the shaft, a crank-pin affixed to said carriage, a rod passing through the hollow shaft and secured against turning with the same, means for reciprocating the rod in the direction of its length, and an operative connection between the carriage and the rod constructed to revolve about said rod and to be actuated by the latter to vary the throw of the crank-pin, substantially as described.

2. The herein-described mechanism for varying the throw of cranks, consisting of a hollow revolving shaft provided at its end with a head provided with ways at right angles to the shaft, a carriage guided in said ways and provided with inclined slots, a crank-pin affixed to said carriage, a box guided in the direction of the length of the shaft and provided with lugs engaging the slots in the carriage, and a rod passing through the hollow shaft and adjustable in the direction of its length, combined with means for adjusting said rod, substantially as and for the purpose set forth.

In testimony whereof I have signed my name to this specification in the presence of two subscribing witnesses.

CHRISTIAN SEYBOLD.

Witnesses:
 FRIEDRICH CORRELL,
 HEINRICH DEBUS.